United States Patent [19]

Renkowsky

[11] 4,160,005
[45] Jul. 3, 1979

[54] METHOD OF FABRICATING A SELECTIVELY SHAPED AND APERTURED PART OF FIBER REINFORCED PLASTIC

[75] Inventor: Robert K. Renkowsky, Bridgeport, Conn.

[73] Assignee: United Technologies Corporation, Hartford, Conn.

[21] Appl. No.: 848,954

[22] Filed: Nov. 7, 1977

[51] Int. Cl.² .......................... B29G 5/00; B29D 3/02
[52] U.S. Cl. ..................................... 264/137; 156/267; 264/161; 264/163; 264/255; 264/258; 264/294
[58] Field of Search ............... 156/267, 289, 242, 245, 156/308, 510; 264/137, 138, 161, 294, 257, 258, 338, 294, 236, 347, 295, 163

[56] References Cited

U.S. PATENT DOCUMENTS

| | | |
|---|---|---|
| 2,170,662 | 8/1939 | Mitchell et al. .................. 156/267 |
| 2,710,046 | 6/1955 | Marcus et al. .................... 156/267 |
| 2,748,048 | 5/1956 | Russell ............................ 156/289 |
| 3,185,605 | 5/1965 | Osborne et al. .................. 156/242 |
| 3,234,064 | 2/1966 | Smith .............................. 156/267 |
| 3,303,081 | 2/1967 | Michaelson et al. ............. 156/289 |
| 3,311,520 | 3/1967 | Michaelson et al. ............. 156/289 |
| 3,373,068 | 3/1968 | Grosheim et al. ................ 156/289 |
| 3,400,013 | 9/1968 | Harrison ......................... 156/289 |

Primary Examiner—W.E. Hoag
Attorney, Agent, or Firm—Vernon F. Hauschild

[57] ABSTRACT

A fiber reinforced plastic part is fabricated by laying-up upon a properly shaped mold layers of uncured fiber reinforced plastic. The layers are cut through around the outer periphery of the part and its apertures and the waste material left in place during the curing process. The waste material so cut is thereafter pressed away from the finished part material to form a smooth finished part outer periphery and smooth aperture peripheries along the smooth lines established by the cutting process.

3 Claims, 1 Drawing Figure

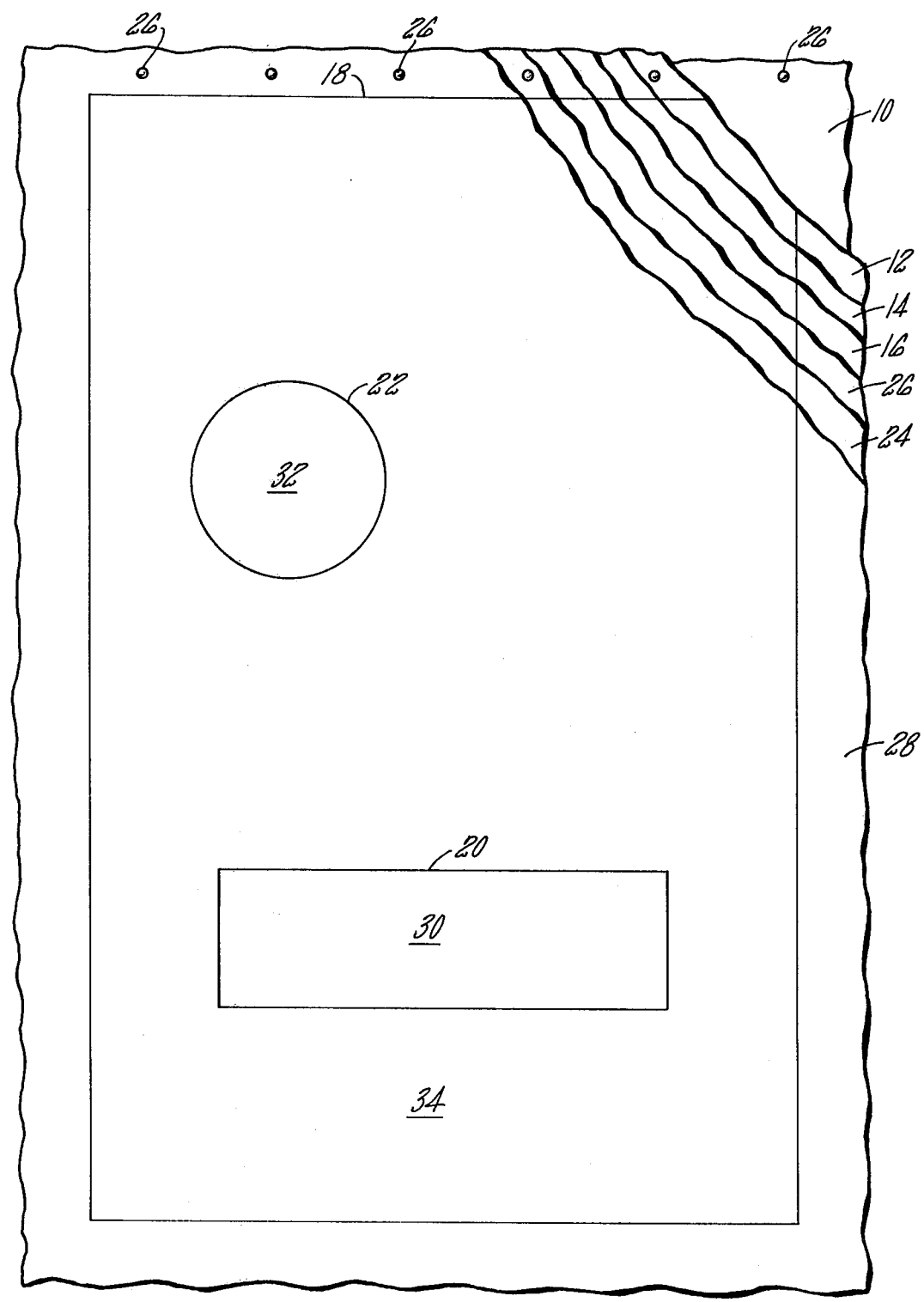

METHOD OF FABRICATING A SELECTIVELY SHAPED AND APERTURED PART OF FIBER REINFORCED PLASTIC

BACKGROUND OF THE INVENTION

1. Field of Invention

This invention relates to the fabrication of fiber reinforced plastic parts and more particularly to a method of fabricating such parts so that the outer periphery of the part and all apertures therein are smoothly trimmed.

2. Description of the Prior Art

Fiber reinforced plastic parts have been formed using molding processes in the past and the outer periphery of the part and apertures in the part have been cut following the curing process. The result was a very ragged, fuzzy edge at the finished part and aperture peripheries. In view of the nature of fiber reinforced plastic, these trimming cuts had to be made with diamond cutters, band saws and high speed routers and these instruments had to be replaced frequently due to the difficulty in trimming organic reinforcing material, such as DuPont's Kevlar R. Further, the finished part had to be wet sanded or otherwise treated extensively to remove the rough, fuzzing condition created by this initial trimming. This prior art trimming procedure was not only expensive to accomplish because of the rate at which the expensive cutting tools involved had to be replaced, but also because of the man hours which had to be expended in cleaning up the irregular cuts made during the initial trimming process.

It has also been practice to perform the trimming process while the fiber reinforced plastic is in its uncured state and then place selectively shaped plugs or dams in the aperture so cut out of the uncured reinforced plastic for part curing. This method, however, proved unsatisfactory because it is expensive to fabricate the selectively shaped plugs required, special fixtures are required to hold these plugs in position on the mold during the curing process, and experience has shown that the curing process produced a resin rich area at the aperture surface which is brittle and is prone to crack or break off in handling or during operation.

SUMMARY OF THE INVENTION

A primary object of the present invention is to teach a method of producing a selectively shaped, contoured and apertured fiber reinforced plastic part having a smooth finished part periphery and smooth aperture peripheries or defining surfaces.

It is a further object to teach such a method which consumes a minimum of time, which requires no special dams or fixtures, which creates no health hazards.

In accordance with the present invention, the trimming method utilized is to cut through all fiber reinforced plastic layers after they are laid-up upon the mold and before they are cured, and to cure the part with the waste material so trimmed remaining in position so that, following curing, the trimmed material may be pressure severed from the finished part along the trim lines established by the cutting process.

It is a further object to teach such a method which creates no dust or noxious fumes during the trimming operation.

Other objects and advantages of the present invention may be seen by referring to the following description and claims, read in conjunction with the accompanying drawings.

BRIEF DESCRIPTION OF THE DRAWING

FIG. 1 is a drawing, partially broken away, showing a typical part being fabricated using my fabrication method.

DESCRIPTION OF THE PREFERRED EMBODIMENT

The process taught herein may be used to fabricate any fiber reinforced plastic part, such as an aircraft instrument panel or an automobile dashboard, and it will be evident to those skilled in the art that the materials and fixtures used will depend upon the requirements of the part being fabricated.

Viewing FIG. 1 to assist in the explanation of my improved part fabrication process, a mold 10 is provided of the shape and contour of the finished reinforced plastic part being fabricated. Mold 10 may be either a male or a female or a flat mold, depending upon the shape of the finished part being fabricated. With the mold in position, a selected number of layers or laminates of uncured fiber reinforced plastic are laid-up upon the mold and smoothly positioned to the shape of the mold, with layers 12, 14 and 16 being laid-up individually in succession. Layers 12–16 are preferably B-staged reinforced plastic layers in which the plastic partially cured to reduce its viscosity for ease of handling. B-staged reinforced plastic is fully described in the Handbook of Fiberglass and Advanced Plastic Composition by George Lubin and published with 1969 copyright notice by the Van Nostrand, Rhenhold Company. Layers 12–16 may be any fiber reinforced plastic, such as fiberglass cloth impregnated with epoxy or polyester or DuPont's Kevlar impregnated with epoxy. While fiberglass and Kevlar may be in woven cloth form, it should also be noted that selectively orientated strands of the material so impregnated could be used, depending upon the requirements of the part being fabricated. The plastic reinforcement could also be nylon, graphite or any fiber or filament material high in tensil strength, in woven or other form. The plastic need not be limited to epoxy and polyester but could be any suitable curable plastic which satisfies the requirements of the part being fabricated.

Layers 12–16 of the uncured fiber reinforced plastic are of such size that they are larger than the part being fabricated and therefore, when laid-up on mold 10 project outwardly beyond the periphery 18 of the part being fabricated. The particular part being fabricated in my FIG. 1 illustration has an outer periphery along the lines of rectangle 18 and has a requirement for rectangular aperture 20 and circular aperture 22 therein, selectively positioned to receive objects such as instrument dials or the like therein. With the uncured laminates so laid-up upon the mold, the trimming process is performed. In this trimming process, a cutting instrument, such as a sharp knife, is used to cut through all layers of the uncured fiber reinforced plastic while in the uncured and laid-up state. An auxiliary trim bonnet 24, positioned from guide tooling pins 26, which project from the mold surface is laid over the laminates so laid-up to guide in the trimming process and to provide a positive guide along which the trimming cuts may be made through all layers or laminates along lines to define the periphery 18 of the part being fabricated and the peripheries 20 and 22 of the apertures therein. These trim cuts are true trim lines for the part and its apertures. These scrap or waste material 28 outboard of trim line 18 and the scrap material 30 and 32 within apertures 20 and 22 is retained in the position shown following this trimming process to serve as plugs within apertures 20 and 22 and an outer boundary defining support outboard of trim line 18 during the curing process. Following this trimming process in which all layers are cut through with the waste material remaining in place, the auxiliary trim bonnet is removed and the peel ply layer 26, which may be made of nylon, is laid-up over outer fiber reinforced plastic layer 16.

The mold 10 with the layers of uncured fiber reinforced plastic 12-16 and peel ply 26 so laid-up and with the trimming process described above having taken place, is then preferably placed in a vacuum bag and the entire unit so bagged placed in an appropriate autoclave or oven that is conventional fashion for curing. While I prefer the plastic vacuum bag method, it will be evident to those skilled in the art that any mold arrangement and curing process suitable for the plastic material of the finished part is acceptable.

Following curing the bagged unit is removed from the autoclave, the vacuum bag and peel ply removed, and the finished part, with waste material in place is stripped from the mold. Use of the peel ply is for holding in place the precut laminates during cure. Peel ply is sometimes used on mold surface when required. At no time is peel ply required to be cut during fabrication of part. Peel ply is not mandatory when fabricating parts to this method, it is only used at the discretion of the fabricator.

In view of the fact that our fiber reinforced plastic layers were cut through before curing, it is now possible to apply pressure to the waste material 28 outboard of trim line 18 and cleanly snap that material clear of the finished part 34 and to similarly apply pressure to the waste material 30 and 32 within apertures 20 and 22 to cleanly snap the waste material clear of these apertures. Having followed my fabrication process, clean edges are thereby accomplished around the outer periphery 18 of the finished product 34 and about the peripheries of apertures 20 and 22.

My experience shows that in view of the cut-through of the uncured fiber reinforced plastic layers 12-16 which took place during the trimming process, that the waste material can be cleanly snapped off forming clean boundaries or edges for the apertures and finished part in a manner similar to that experienced in cutting glass wherein a line is scribed in the glass and the glass may be cleanly snapped off along that line thereafter.

I wish it to be understood that I do not desire to be limited to the exact details of construction shown and described, for obvious modifications will occur to a person skilled in the art.

I claim:

1. The method of fabricating a selectively shaped, contoured and apertured part of fiber reinforced plastic comprising the steps of:
    (A) providing a mold of the part final shape,
    (B) laying-up upon the mold the desired number of layers of preimpregnated and uncured fiber reinforced plastic,
    (C) cutting through the layers so laid-up around the outer periphery of the part being fabricated and around the periphery of all apertures therein,
    (D) curing the layers so laid-up with the waste material so cut in place,
    (E) removing the cured material from the mold, and
    (F) pressing the cured waste material so cut away from the cured material of the part being fabricated to cause severance of the waste material from the finished part along the smooth lines established by the cutting process.

2. A method according to claim 1 and including the additional step of positioning an auxiliary trim bonnet over the layers of uncured fiber reinforced plastic so laid-up upon the mold to serve as a guide for the cutting operation.

3. A method according to claim 1 including laying-up a peel ply over the laid-up uncured fiber reinforced plastic following the cutting operation and before the curing operation so that the outer surface of the part being fabricated needs no smoothing operation following curing and removal from the mold.

* * * * *